United States Patent
Yen

(10) Patent No.: US 9,990,025 B2
(45) Date of Patent: Jun. 5, 2018

(54) POWER CONTROL METHODS AND ELECTRONIC DEVICES CAPABLE OF DYNAMICALLY DISTRIBUTING POWER

(71) Applicant: Quanta Computer Inc., Taoyuan (TW)

(72) Inventor: Wei-Ting Yen, Taoyuan (TW)

(73) Assignee: QUANTA COMPUTER INC., Guishan Dist., Taoyuan (TW)

( * ) Notice: Subject to any disclaimer, the term of this patent is extended or adjusted under 35 U.S.C. 154(b) by 108 days.

(21) Appl. No.: 15/096,648

(22) Filed: Apr. 12, 2016

(65) Prior Publication Data
US 2017/0147062 A1 May 25, 2017

(30) Foreign Application Priority Data
Nov. 25, 2015 (TW) .............................. 104139083 A

(51) Int. Cl.
G06F 1/26 (2006.01)
G06F 1/32 (2006.01)

(52) U.S. Cl.
CPC ............ G06F 1/3296 (2013.01); G06F 1/263 (2013.01); G06F 1/3212 (2013.01); G06F 1/3234 (2013.01); Y02B 60/1292 (2013.01)

(58) Field of Classification Search
None
See application file for complete search history.

(56) References Cited

U.S. PATENT DOCUMENTS

| | | | |
|---|---|---|---|
| 2008/0219031 A1* | 9/2008 | Kernahan | H02M 1/15 363/21.01 |
| 2011/0125337 A1* | 5/2011 | Zavadsky | G06F 1/263 700/291 |
| 2013/0049487 A1* | 2/2013 | Lanni | H02M 1/10 307/151 |
| 2013/0339757 A1* | 12/2013 | Reddy | G06F 1/3212 713/300 |
| 2014/0281618 A1* | 9/2014 | Sultenfuss | G06F 1/263 713/323 |
| 2014/0336963 A1* | 11/2014 | Ji | G06F 1/28 702/63 |
| 2017/0116840 A1* | 4/2017 | Montero | G06F 1/28 |

* cited by examiner

*Primary Examiner* — Kim Huynh
*Assistant Examiner* — Danny Chan
(74) *Attorney, Agent, or Firm* — McClure, Qualey & Rodack, LLP

(57) ABSTRACT

A power control method for an electronic device including a built-in battery and detachably connected to an external adaptor, including: detecting whether the external adaptor is connected to the electronic device; obtaining information regarding the external adaptor when the external adaptor is connected to the electronic device; estimating a current value according to the information regarding the external adaptor and an amount of power consumption of the electronic device; and controlling the battery to output a fixed current according to the current value to supply power to the electronic device, wherein at this time the electronic device is powered by both the external adaptor and the battery.

8 Claims, 6 Drawing Sheets ated on Nov. 25, 2015, the entirety

POWER CONTROL METHODS AND ELECTRONIC DEVICES CAPABLE OF DYNAMICALLY DISTRIBUTING POWER

CROSS REFERENCE TO RELATED APPLICATIONS

This application claims priority of Taiwan Patent Application No. 104139083, filed on Nov. 25, 2015, the entirety of which is incorporated by reference herein.

BACKGROUND OF THE INVENTION

Field of the Invention

The invention relates to an electronic device, and more particularly to an electronic device capable of dynamically distributing power.

Description of the Related Art

Computers have come to be commonly used as consumer electronic devices nowadays due to the development of information and technology. Consumers not only use computers for word processing, but also for obtaining information through the Internet. Their portability and convenience has also made laptops rise in popularity. Although the performance of laptops continues to improve, as their size and weight continue to decrease, once a laptop cannot meet the needs of its user, this laptop may be eliminated in favor of a newer model.

Laptops are generally powered by a built-in battery or external power supply. The external power supply usually connects the utility power through an adaptor which transforms the AC utility power into the DC power required by the laptop. But when a laptop is eliminated, the adaptor that came with that laptop can still be used. It would appear to be a waste of money if these adaptors are discarded, too.

BRIEF SUMMARY OF THE INVENTION

Electronic devices and power control methods are provided. An exemplary embodiment a of power control method for an electronic device comprising a built-in battery and detachably connected to an external adaptor, including: detecting whether the external adaptor is connected to the electronic device; obtaining information regarding the external adaptor when the external adaptor is connected to the electronic device; estimating a current value according to the information regarding the external adaptor and an amount of power consumption of the electronic device; and controlling the battery to output a fixed current according to the current value to supply power to the electronic device, wherein at this time the electronic device is powered by both the external adaptor and the battery.

An exemplary embodiment of an electronic device capable of dynamically distributing power and detachably connected to an adaptor comprises a battery, a detection circuit, a power control chip and a processor. The detection circuit detects whether the adaptor is connected to the electronic device. The power control chip is coupled to the detection circuit to obtain an output power of the adaptor. The processor is coupled to the power control chip, estimates a current value according to the output power and an amount of power consumption of the electronic device and activates a dynamic power distribution mechanism to control the battery to output a fixed current according to the current value to supply power to the electronic device. The electronic device is powered by both the adaptor and the battery.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
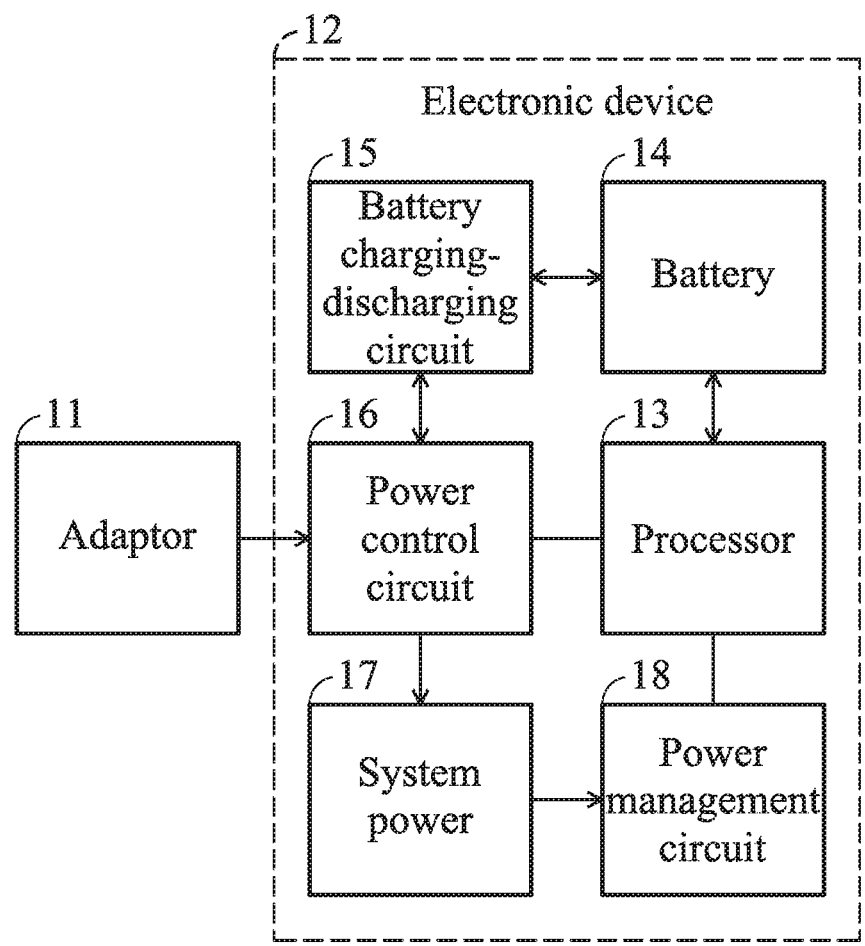
FIG. 1 is a schematic diagram of an electronic device capable of dynamically distributing power according to an embodiment of the invention.

FIG. 1 is a schematic diagram of an electronic device capable of dynamically distributing power according to an embodiment of the invention. The electronic device 12 may comprise a processor 13, a battery 14, a battery charging-discharging circuit 15, a power control circuit 16, a system power 17 and a power management circuit 18. The electronic device 12 may be powered by the battery 14, or powered by an adaptor 11 when the adaptor 11 is connected thereto. In addition, when the electronic device 12 is connected to the adaptor 11, the battery 14 may be charged by the adaptor 11. The system power 17 may receive the power supplied by the battery 14 and/or the adaptor 11 and may be controlled by the power management circuit 18 to supply power to the devices comprised in the electronic device 12.

Generally, the electronic device 12 may set a value for power consumption. The power consumption may be the maximum power required when the electronic device 12 operates. The adaptor 11 has an output power and the output power is normally greater than or equal to the power consumption. In the embodiments of the invention, when the output power of the adaptor 11 is smaller than the power consumption, the dynamic power distribution mechanism of the electronic device 12 uses the adaptor 11 and the battery 14 to supply power to the system power 17.

Referring to table 1, which lists the relationships of the output power, voltage and current of the adaptor 11 in a normal case.

TABLE 1

The relationships of the output power,
voltage and current of the adaptor 11

| Power(W) | 30 | 45 | 65 | 90 | 130 |
|---|---|---|---|---|---|
| Voltage (V) | 19.5 | 19.5 | 19.5 | 19.5 | 19.5 |
| Current (I) | 1.54 | 2.3 | 3.34 | 4.61 | 6.66 |

From table 1, it can be seen that the output voltage of the adaptor 11 is fixed. Although the proposed dynamic power distribution mechanism is applied to the adaptor having fixed output voltage, the invention should not be limited thereto. By designing the circuit in the electronic device, the proposed dynamic power distribution mechanism can also be applied to the adaptor having variable output voltages. In an embodiment of the invention, when the output voltage of the adaptor is greater than a predetermined voltage of the electronic device, a converter circuit can be designed in the electronic device to convert the output voltage down to conform to the predetermined voltage of the electronic device.

When the power control circuit 16 detects that the adaptor 11 is connected to the electronic device 12, the power control circuit 16 obtains information regarding the output power of the adaptor 11 and transmits the information to the processor 13. Information regarding the output power can be transmitted to the power control circuit 16 via an extra pin. Another way to obtain the information regarding the output power is that the power control circuit 16 calculates the output power of the adaptor according to a current flowing through a resistor comprised in the power control circuit 16. When the processor 13 receives the information regarding the output power, the processor 13 determines whether the output power is greater than one half of the power consumption of the electronic device 12. When the output power is smaller than one half of the power consumption of the electronic device 12, the processor 13 generates a warning message via an operating interface to notify the user that the dynamic power distribution mechanism is not supported.

When the output power of the adaptor 11 is greater than one half of the electronic device 12, the processor 13 calculates the amount of output current of the battery 14 according to the output power of the adaptor 11. Generally, when the battery 14 operates, the output current of the battery 14 is determined according to the amount current currently required by the electronic device 12 or determined by the loading coupled to the battery 14, and the amount of output current is not limited. A normal protection scheme of the battery 14 is to limit the amount of charges being discharged within a predetermined time, for example, discharging 1.5 C every ten seconds (−1.5 C/10 sec) or discharging 2 C every thirty seconds (−2 C/30 sec), where C is a unit to measure the amount of current of a battery. In the proposed dynamic power distribution machine, the discharging current is fixed to compensate for the insufficient power of the adaptor 11.

For example, the power consumption of the electronic device 12 is 130 W, the output power of the adaptor 11 is 65 W and the output voltage of the battery 14 is 11.1V. The processor may calculate the output current value of the battery 14 according to the equation below:

$$(130-65)/11.1=5.86A \qquad \text{Eq. (1)}$$

When the power consumption of the electronic device 12 is 130 W, the output power of the adaptor 11 is 90 W and the output voltage of the battery 14 is 11.1V. The processor may calculate the output current value of the battery 14 according to the equation below:

$$(130-90)/11.1=3.6A \qquad \text{Eq. (2)}$$

The processor 13 may store the calculated current value in a predetermined address of a register. Then, the processor 13 may control the battery 14 to output a fixed current according to the current value to supply power to the system power 17. Therefore, when the dynamic power distribution machine of the electronic device 12 is activated, the system power 17 receives power from both the battery 14 and the adaptor 11. In other words, when the dynamic power distribution machine of the electronic device 12 is activated, the electronic device is powered by both the battery 14 and the adaptor 11.

In this and the following embodiments, the data is transmitted via the System Management Bus (SMBus or SMB). In this application, the dynamic power distribution machine of the electronic device 12 may also be activated via the SMBus command set. Referring to table 2, which is an exemplary SMBus command set listing a portion of the SMBus commands. The processor 13 may execute the corresponding actions according to the received command code.

TABLE 2 exemplary SMBus command set

| Function | Command code | Access right | Unit |
|---|---|---|---|
| Temperature | 0x08 | Read | 0.1° k |
| Voltage | 0x09 | Read | mV |
| Current | 0x0a | Read | mA |
| Battery Status | 0x16 | Read | NA |
| Dynamic power distribution | 0x2d | Read/write | NA | n the SMBus standards, there is no function and parameter assigned to the commend code 0x2d. Therefore, in the application, the commend code 0x2d is used to activate the dynamic power distribution mechanism.

When the processor 13 receives the command code 0x2d, the processor 13 may read data from a first predetermined address, such as 0x6000, of the register of the SMBus, to determine an operation mode of the electronic device 12. Following are the descriptions of two exemplary commands:

W 2d, Data=0x6000
W 2d, Data=0x6100

The first command is to write 0x6000 in the command code 0x2d, and then read the operation mode of the electronic device 12 from the address 0x6000. In this example, the address 0x6000 refers to the electronic device 12 operating in the dynamic power distribution mode. Therefore, the processor 13 may access the address 0x1f of the register to obtain the output current value of the battery. Then, the processor 13 may control a battery power measuring chip (Gas gauge) to control the discharge current of the battery 14 according to the current value.

The second command is to write 0x6100 in the command code 0x2d, and then read the operation mode of the electronic device 12 from the address 0x6100. In this example, the address 0x6000 refers to the electronic device 12 operating in a normal mode. Therefore, the battery does not discharge.

The SMBus command operations in the above-described embodiments can be applied in all embodiments of the application. However, for brevity, the SMBus command operations are omitted in the following embodiments. In the embodiment shown in FIG. 1, the electronic device 12 may be a notebook computer or a handheld electronic device with a built-in battery.

Figure 2:
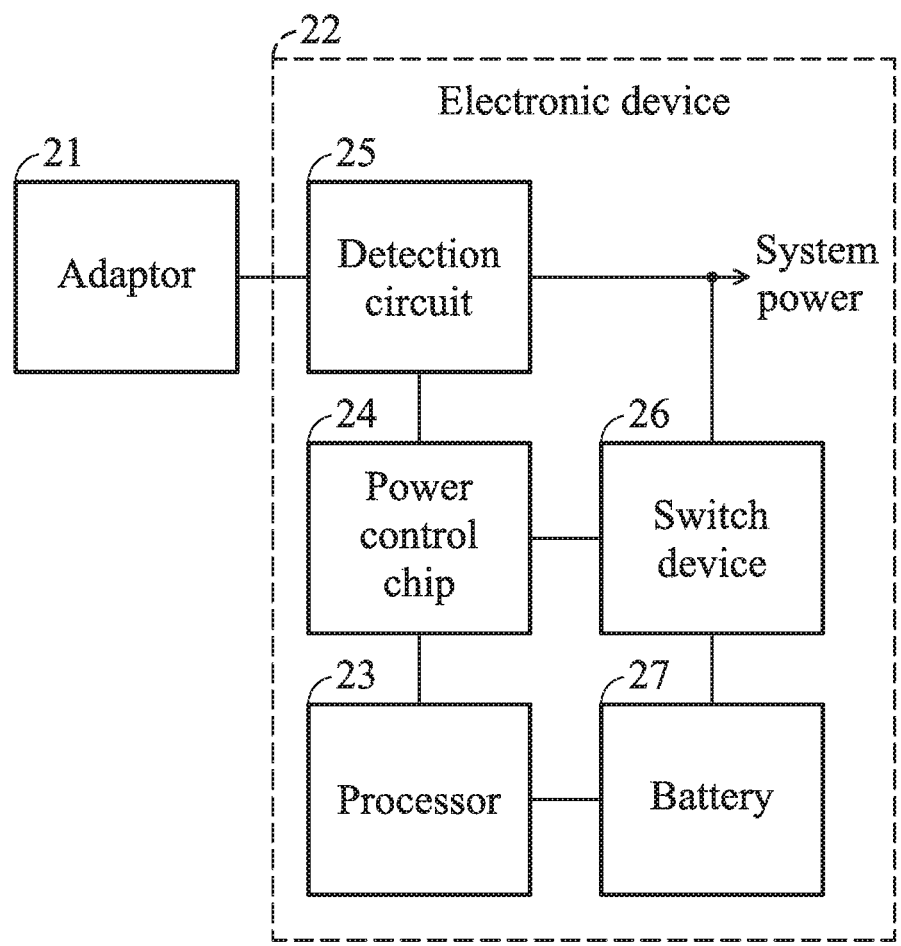
FIG. 2 is a schematic diagram of an electronic device capable of dynamically distributing power according to another embodiment of the invention.

FIG. 2 is a schematic diagram of an electronic device capable of dynamically distributing power according to another embodiment of the invention. The electronic device 22 may comprise a processor 23, a power control chip 24, a detection circuit 25, a switch device 26 and a battery 27. The electronic device 22 may be powered by the battery 27, or powered by an adaptor 21 when being connected to the adaptor 21. In addition, when the electronic device 22 is connected to the adaptor 21, the battery 27 can be charged by the adaptor 21. The system power may receive the power supplied by the battery 27 and/or the adaptor 21 and supply power to the devices comprised in the electronic device 22.

Generally, the electronic device 22 may set a value for the power consumption. The power consumption may be the maximum power required when the electronic device 22 operates. The adaptor 21 has an output power and the output power is normally greater than or equal to the power consumption. In the embodiments of the invention, when the output power of the adaptor 21 is smaller than the power consumption, the power control chip 24 of the electronic device 22 uses the adaptor 21 and the battery 27 to supply power to the system power.

When the detection circuit 25 detects that the adaptor 21 is connected to the electronic device 22, the detection circuit 25 may obtain information regarding the output power of the adaptor 21 and provide the information to the processor 23 via the power control chip 24. The information regarding the output power may also be transmitted by the adaptor 21 to the power control chip 24 via an extra pin. Another way to obtain the information is that the power control chip 24 or the processor 23 obtains a value of a current flowing through a resistor comprised in the detection circuit 25 to calculate the output power of the adaptor. When the processor 23 receives the information regarding the output power, the processor determines whether the output power of the adaptor 21 is greater than one half of the power consumption of the electronic device 22.

When the output power of the adaptor 21 is smaller than one half of the power consumption, the processor 23 generates a warning message via an operating interface to notify the user that the dynamic power distribution mechanism is not supported. When the output power of the adaptor 21 is greater than one half of the power consumption, the detection circuit 25 directly provides the power provided by the adaptor 21 to the system power and the power control chip 24 turns off the switch device 26.

Generally, when the battery 27 operates, the output current of the battery 27 is determined according to the amount current currently required by the electronic device 22 or determined by the loading coupled to the battery 27, and the amount of output current is not limited. In the application, due to the insufficient power of the adaptor 21, the power of the battery 27 is provided to compensate for the power insufficiency. In the application, the processor 23 or the power control chip 24 controls the output current of the battery 27 to compensate for the power insufficiency of the adaptor 21.

For example, the power consumption of the electronic device 22 is 130 W, the output power of the adaptor 21 is 65 W and the output voltage of the battery 27 is 11.1V. The processor may calculate the output current value of the battery 27 according to the equation below:

$$(130-65)/11.1=5.86A \qquad \text{Eq. (3)}$$

When the power consumption of the electronic device 22 is 130 W, the output power of the adaptor 21 is 90 W and the output voltage of the battery 27 is 11.1V. The processor may calculate the output current value of the battery 27 according to the equation below:

$$(130-90)/11.1=3.6A \qquad \text{Eq. (4)}$$

The processor 23 may store the calculated current value in a predetermined address of a register. Then, the processor 23 may instruct the power control chip 24 to turn on the switch device 26 and control the battery 27 to output a fixed current to supply power to the system power. Therefore, when the dynamic power distribution machine of the electronic device 22 is activated, the system power receives power from both the battery 27 and the adaptor 21. In other words, when the dynamic power distribution machine of the electronic device 22 is activated, the electronic device is powered by both the battery 27 and the adaptor 21.

In another embodiment of the invention, the switch device 26 may comprise a current control circuit. The power control chip 24 may control the current control circuit according to the current value calculated by the processor 23, such that the system power can obtain sufficient power.

Figure 3:
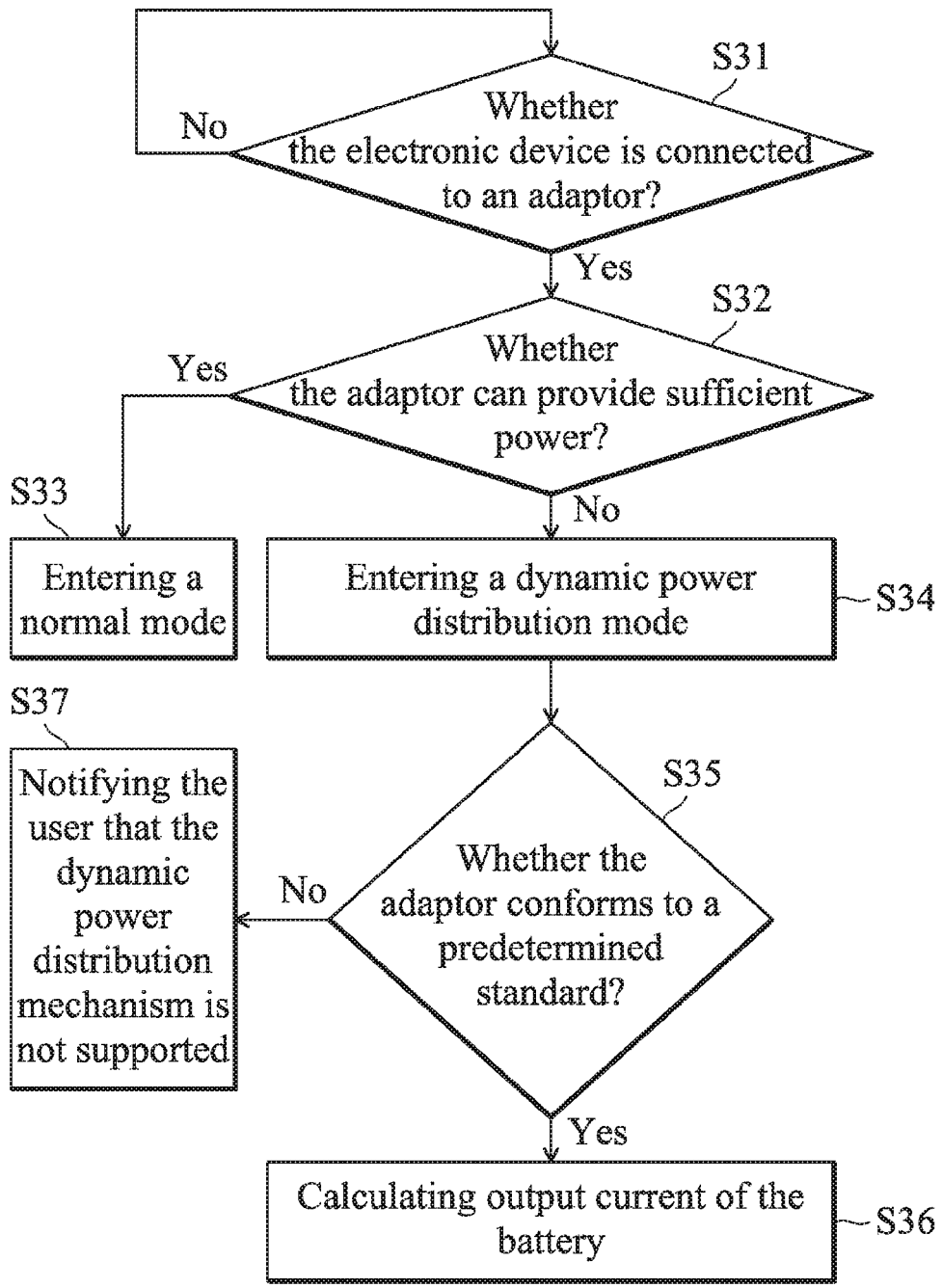
FIG. 3 is a flow chart of a power control method according to an embodiment of the invention.
Figure 6:
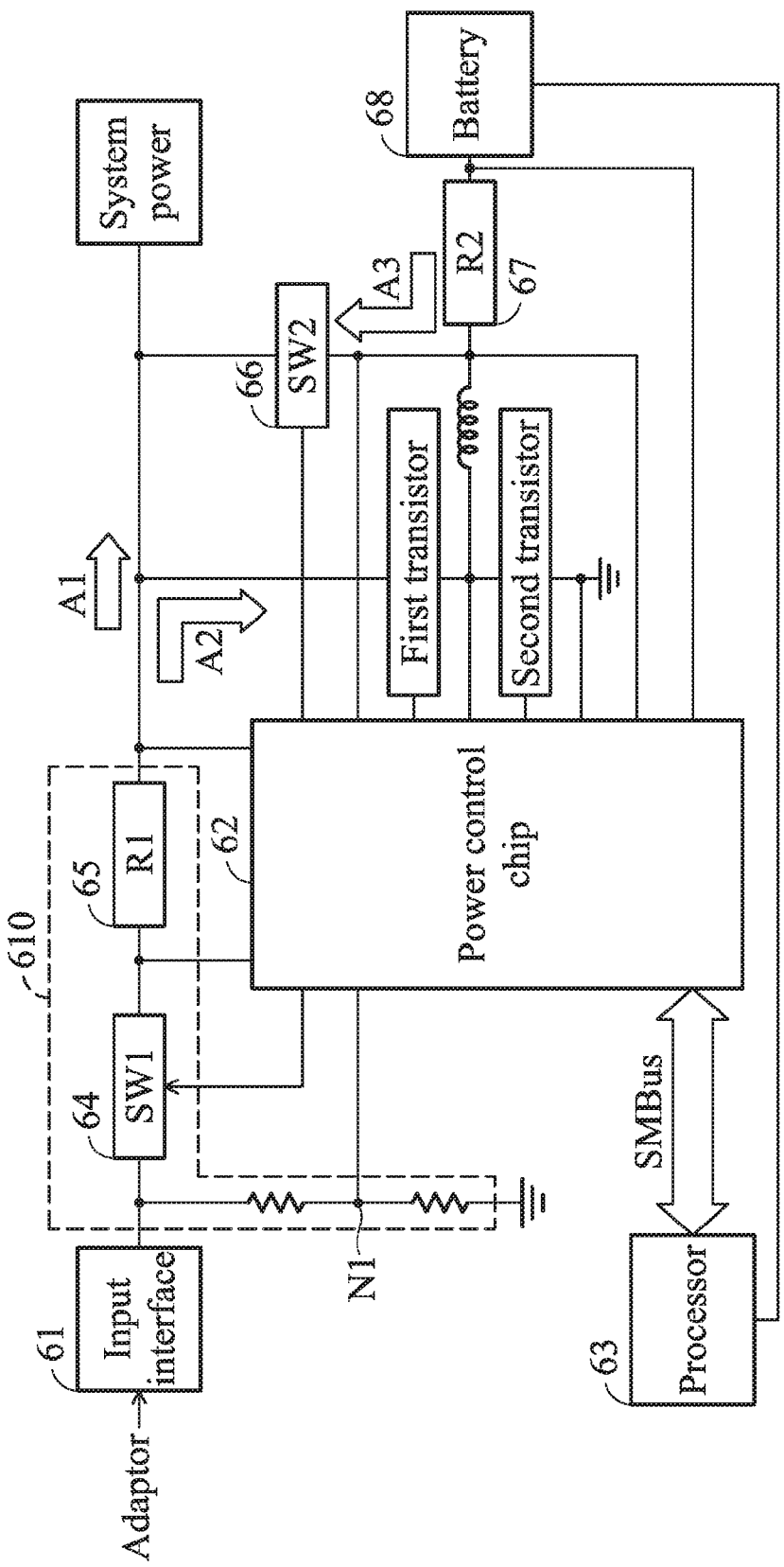
FIG. 6 is a schematic diagram of an electronic device capable of dynamically distributing power according to another embodiment of the invention.

FIG. 3 is a flow chart of a power control method according to an embodiment of the invention. The proposed power control method can be applied to any electronic device with a built-in battery, such as a notebook computer. The proposed power control method can be performed by the processor and the battery power measuring chip (Gas gauge) of the electronic device. In the embodiments of the invention, the proposed power control method can also be performed by the electronic devices as shown in FIG. 1, FIG. 2 and FIG. 6.

In step S31, a detection circuit of the electronic device detects whether the electronic device is connected to an adaptor. When the electronic device is not connected to an adaptor, it is stayed in step S31 until that connection of an adaptor is detected. When the detection circuit detects that the electronic device is connected to an adaptor, the detection circuit (or the battery power measuring chip, or the processor) performs step S32. In step S32, the detection circuit (or the battery power measuring chip, or the processor) determines whether the adaptor can provide sufficient power to the electronic device. When the adaptor can provide sufficient power to the electronic device, step S33 is performed for the electronic device to operate in a normal mode. When the adaptor cannot provide sufficient power to the electronic device, step S34 is performed for the electronic device to enter the dynamic power distribution mode. Note that in step S34, the electronic device does not yet perform the dynamic power distribution mechanism described above.

In step S35, the power control circuit or the processor in the electronic device determines whether the output power of the adaptor falls in a predetermined range (that is, conforms to a predetermined standard). In the embodiment, the output power of the adaptor has to be smaller than the power consumption of the electronic device and greater than one half of the power consumption. When the output power of the adaptor is smaller than one half of the power consumption, step S37 is performed for the electronic device to notify the user that the dynamic power distribution mechanism is not supported. When the output power of the adaptor is greater than one half of the power consumption, step S36 is performed for the processor of the electronic device to calculate the output current of the battery. The method to calculate the output current may refer to the description of FIG. 2, and are omitted here for brevity. When the output current of the battery is obtained, the processor of the electronic device may store the current value in a predetermined address of a register and the battery power measuring chip may read the current value from the predetermined address and control the battery to output a fixed current to supply power to the electronic device. At this time the electronic device is powered by both the external adaptor and the battery.

Figure 4:
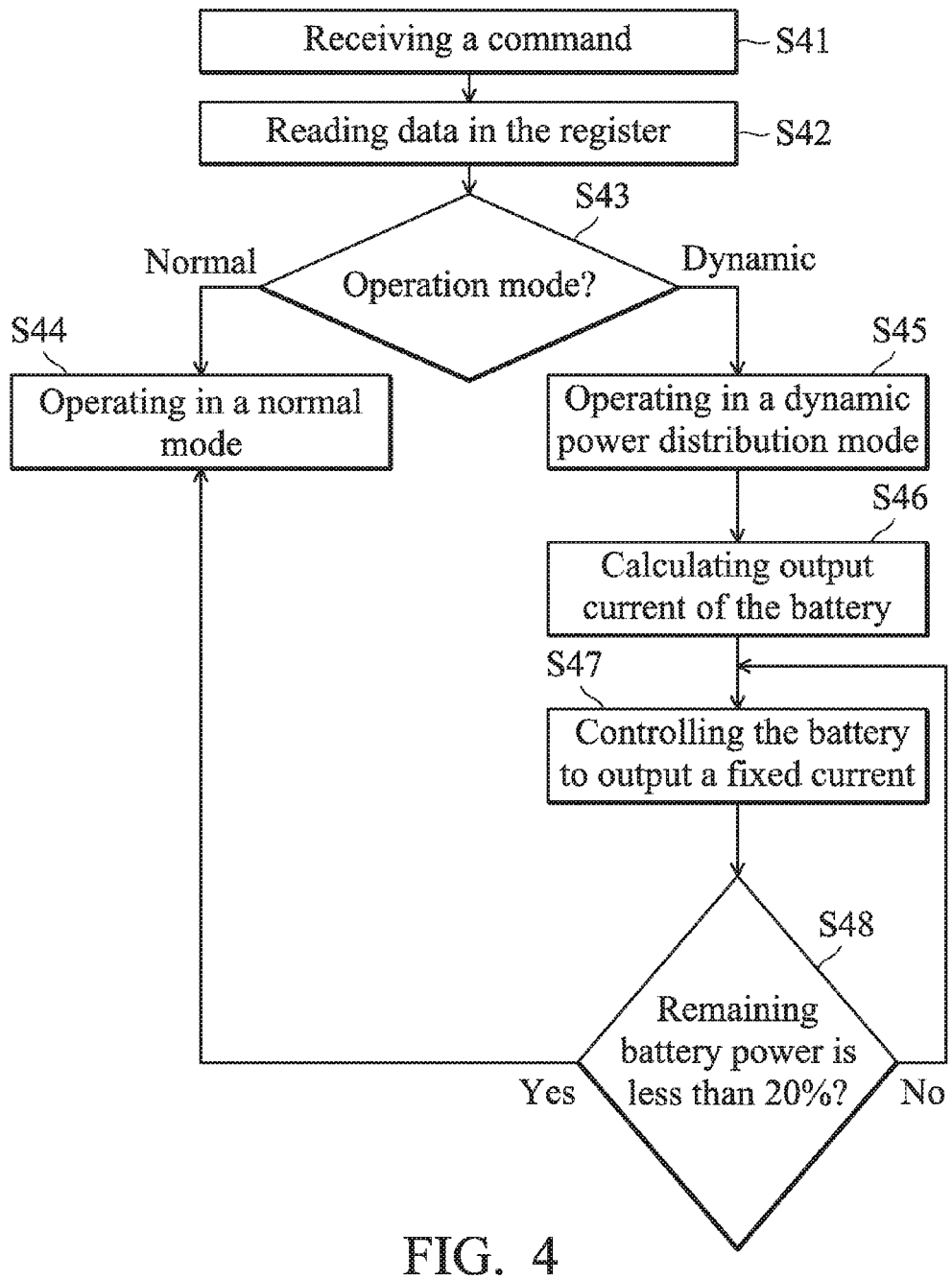
FIG. 4 is a flow chart of a power control method according to another embodiment of the invention.

FIG. 4 is a flow chart of a power control method according to another embodiment of the invention. The proposed power control method can be applied to any electronic device with a built-in battery, such as a notebook computer. The proposed power control method can be performed by the processor and the battery power measuring chip (Gas gauge) of the electronic device. In the embodiments of the invention, the proposed power control method can also be performed by the electronic devices as shown in FIG. 1, FIG. 2 and FIG. 6.

When the electronic device is connected to an adaptor and the adaptor supports the proposed dynamic power distribution mechanism, the step S41 is performed to receive a command to activate the proposed dynamic power distribution mechanism. In an embodiment, once the electronic device determines that the adaptor supports the proposed dynamic power distribution mechanism, the command is generated automatically and the proposed dynamic power distribution mechanism is activated for the processor of the electronic device and the battery power measuring chip to perform the proposed dynamic power distribution mechanism. In step S42, the processor of the electronic device reads data stored in the register to obtain a current operation mode. In step S43, the processor of the electronic device confirms the current operation mode of the electronic device. When the electronic device operates in a normal mode, step S44 is performed and at this time, the battery does not supply power to the electronic device. When the electronic device operates in a dynamic power distribution mode, step S45 is performed.

In step S46, the processor of the electronic device calculates the output current of the battery. The method to calculate the output current may refer to the description of FIG. 2, and are omitted here for brevity. When the output current of the battery is obtained, the processor of the electronic device may store the current value in a predetermined address of a register. In step S47, the battery power measuring chip may read the current value from the predetermined address and control the battery to output a fixed current to supply power to the electronic device. At this time the electronic device is powered by both the external adaptor and the battery. In step S48, the battery power measuring chip determines whether the remaining battery power is less than 20%. If the remaining battery power is greater than 20%, the battery keeps discharging by outputting a fixed current. If the remaining battery power is less than 20%, step S44 is performed for the battery to stop supplying power to the electronic device and the electronic device operates in a normal mode instead. At this time, since the electronic device cannot obtain enough power, the electronic device may operate in a power-saving mode or notify the user to shut down the electronic device.

Moreover, the proposed electronic control method may be solely executed and may also be executed continuously with the proposed power control method illustrated in FIG. 3. In FIG. 3, the proposed dynamic power distribution mechanism will not be performed right after the processor of the electronic device calculates the output current of the battery in step S36, and will be performed based on the command received in step S41 in FIG. 4. When it is determined that the electronic device is going to operate in the dynamic power distribution mode, step S46 can be omitted and steps S47 and S48 can be performed directly.

Figure 5:
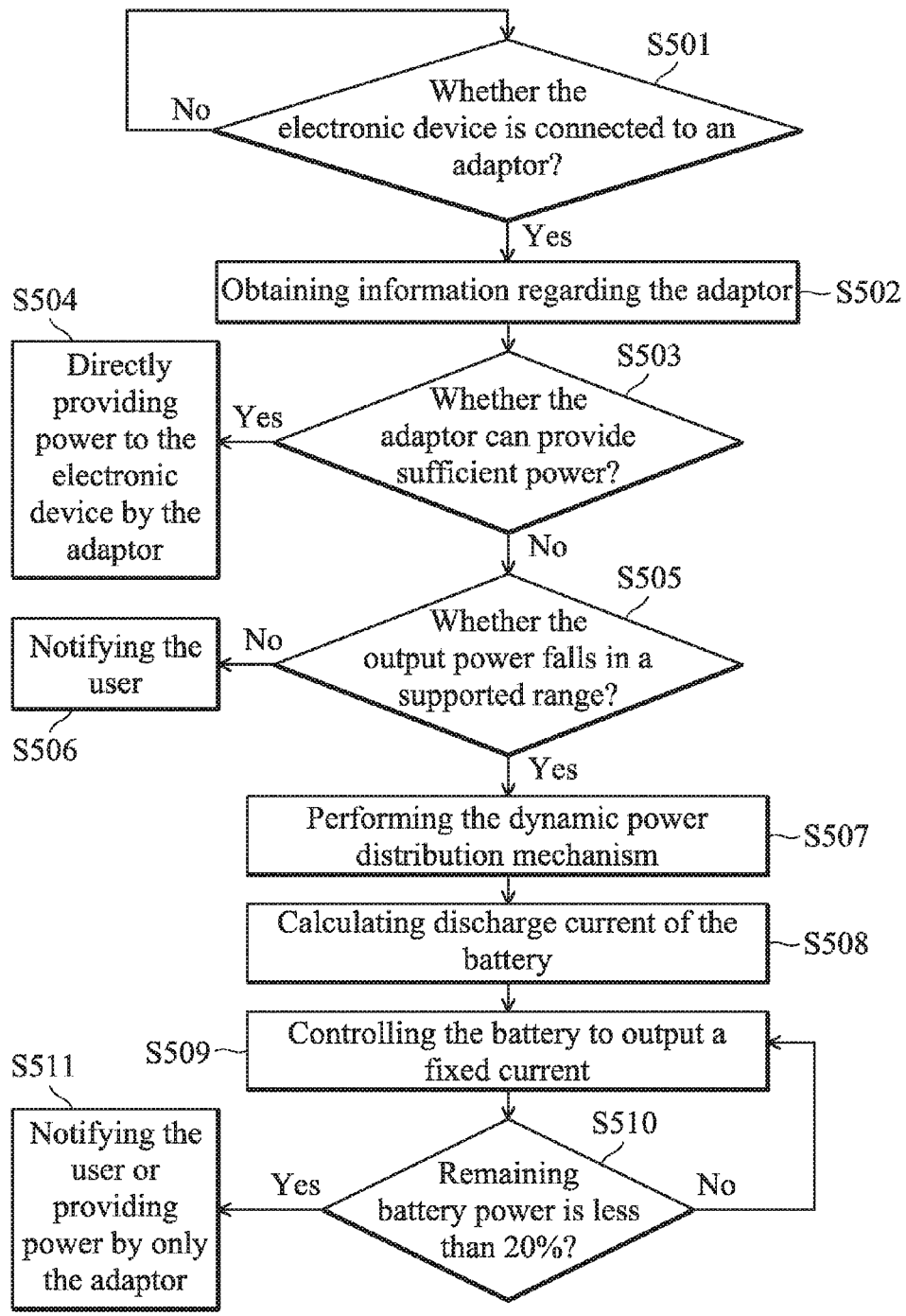
FIG. 5 is a flow chart of a power control method according to another embodiment of the invention.

FIG. 5 is a flow chart of a power control method according to another embodiment of the invention. The proposed power control method can be applied to any electronic device with a built-in battery, such as a notebook computer. The proposed power control method can be performed by the processor and the battery power measuring chip (Gas gauge) of the electronic device. In the embodiments of the invention, the proposed power control method can also be performed by the electronic devices as shown in FIG. 1, FIG. 2 and FIG. 6.

In step S501, a detection circuit of the electronic device detects whether the electronic device is connected to an adaptor. When the detection circuit detects that the electronic device is connected to an adaptor, step S502 is performed for the electronic device to obtain information regarding the adaptor. In an embodiment, information regarding the adaptor is the output power of the adaptor. Next, in step S503, the processor of the electronic device determines whether the adaptor can provide sufficient power to the electronic device. Generally, the electronic device may set a value of the power consumption. The power consumption may be the maximum power required when the electronic device operates. When the adaptor can provide sufficient power to the electronic device, step S504 is performed and at this time the adaptor provides power directly to the electronic device.

When the output power is smaller than the power consumption of the electronic device, step S505 is performed and the processor of the electronic device determines whether the output power of the adaptor falls in a range supported by the dynamic power distribution mechanism. In the embodiment, in the range supported by the dynamic power distribution mechanism, the output power of the adaptor must be smaller than the power consumption of the electronic device and be greater than one half of the power consumption. When the output power of the adaptor is smaller than one half of the power consumption, step S506 is performed and the electronic device may notify the user that the dynamic power distribution mechanism is not supported via a message window, or notify the user that the electronic device can only operate based on the output power of the adaptor.

In step S507, the electronic device performs the dynamic power distribution mechanism. In step S508, the processor of the electronic device calculates the discharge current of the battery according to the power consumption of the electronic device and the output power of the adaptor. In step s509, battery power measuring chip controls the battery output a fixed current to supply power to the electronic device. In step S510, the battery power measuring chip determines whether the remaining battery power is less than 20%. If the remaining battery power is greater than 20%, the battery keeps discharging by outputting a fixed current. If the remaining battery power is less than 20%, step S511 is performed for the battery to stop supplying power to the electronic device and the electronic device operates in a normal mode instead. At this time, since the electronic device cannot obtain enough power, the electronic device may operate in a power-saving mode or notify the user to shut down the electronic device or notify the user that the power of the electronic device is now only supplied by the adaptor.

FIG. 6 is a schematic diagram of an electronic device capable of dynamically distributing power according to another embodiment of the invention. The electronic device may comprise an input interface 61, a power control chip 62, a processor 63, a first switch device SW1 64, a first resistor R1 65, a second switch device SW2 66, a second resistor R2 67, and a battery 68. The detection circuit 610 may comprise the first switch device 64 and the first resistor for detecting whether the adaptor is connected to the input interface 61.

When the detection circuit 610 detects that the adaptor is connected to the input interface 61, the voltage at the terminal N1 is changed to notify the power control chip 62 of this. Meanwhile, the power control chip 62 measures the amount of current flowing through the first resistor 65 to calculate the output power of the adaptor. The power control chip 62 transmits the output power of the adaptor to the processor. When the processor 63 determines that the output power of the adaptor is smaller than the power consumption of the electronic device, the processor further determines whether the output power of the adaptor is greater than one half of the power consumption of the electronic device. When the output power of the adaptor is greater than one half of the power consumption of the electronic device, the processor 63 performs a dynamic power distribution mechanism and calculates a discharge current of the battery 68.

In an embodiment, the processor 63 may directly control the battery 68 to output a fixed current. In another embodiment, the power control chip 62 may control the battery 68 to output a fixed current according to the discharge current calculated by the processor 63. When the dynamic power distribution mechanism is performed, the first transistor is turned off and the second switch device 66 is turned on. At this time, the system power receives power from both the adaptor (shown as the direction A1) and the battery 68 (shown as the direction A3). When the adaptor charges the battery 68, the first transistor is turned on and the second switch device 66 is turned off. At this time, the adaptor provides power in the direction A2 and charges the battery 68 through the second resistor 67.

Besides the operation as illustrated above, the electronic device in this embodiment may also perform the power control method as shown in FIG. 3, FIG. 4 and FIG. 5, and thus the invention should not be limited thereto.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A power control method, for an electronic device comprising a built-in battery and detachably connected to an external adaptor, comprising:
   detecting whether the external adaptor is connected to the electronic device;
   obtaining information regarding the external adaptor when the external adaptor is connected to the electronic device, wherein the information regarding the external adaptor comprises an output power of the external adaptor;
   estimating a current value according to the information regarding the external adaptor and an amount of power consumption of the electronic device;
   determining whether the output power of the external adaptor is greater than one half of the amount of power consumption of the electronic device; and
   when the output power of the external adaptor is greater than one half of the amount of power consumption of the electronic device, controlling the battery to output a fixed current according to the current value to supply power to the electronic device, wherein at this time the electronic device is powered by both the external adaptor and the battery.

2. The power control method as claimed in claim 1, wherein when the output power of the external adaptor is not greater than one half of the amount of power consumption of the electronic device, the method further comprises:
   generating a warning message to notify an user of the electronic device.

3. The power control method as claimed in claim 1, wherein the output power of the external adaptor is provided by the external adaptor to the electronic device or is obtained by electronic device by calculating a current of the electronic device.

4. The power control method as claimed in claim 1, further comprising:
   reading a command from a first predetermined address of a register;
   determining whether the electronic device enters a dynamic power control mode according to the command; and
   when the electronic device enters the dynamic power control mode, reading the current value from a second predetermined address of the register and controlling the battery to output the fixed current according to the current value to supply power to the electronic device.

5. The power control method as claimed in claim 1, further comprising:
   when the output power of the external adaptor is greater than one half of the amount of power consumption of the electronic device, generating a control interface and entering a dynamic power control mode according to an input of a user of the electronic device for the electronic device being powered by both the external adaptor and the battery.

6. An electronic device capable of dynamically distributing power and detachably connected to an adaptor, comprising:
   a battery;
   a detection circuit, detecting whether the adaptor is connected to the electronic device;
   a power control chip, coupled to the detection circuit to obtain an output power of the adaptor; and
   a processor, coupled to the power control chip, estimating a current value according to the output power and an amount of power consumption of the electronic device, determining whether the output power of the adaptor is greater than one half of the power consumption of the electronic device, and when the output power of the adaptor is greater than one half of the power consumption of the electronic device, activating a dynamic power distribution mechanism to control the battery to output a fixed current according to the current value to supply power to the electronic device, wherein the electronic device is powered by both the adaptor and the battery.

7. The electronic device as claimed in claim 6, wherein the power control chip reads a first current flowing through a resistor comprised in the detection circuit to calculate the output power of the adaptor.

8. The electronic device as claimed in claim 6, wherein when the output power of the adaptor is not greater than one half of the power consumption of the electronic device, the processor generates a warning message to notify an user of the electronic device.

* * * * *